United States Patent [19]
Groeblacher

[11] Patent Number: 5,578,328
[45] Date of Patent: Nov. 26, 1996

[54] APPARATUS FOR THE COOLING OF EXTRUDED PLASTIC PROFILES OR SECTIONS

[75] Inventor: Hans Groeblacher, Feasterville, Pa.

[73] Assignee: Mikron Industries, Inc., Kent, Wash.

[21] Appl. No.: 544,787

[22] Filed: Oct. 18, 1995

Related U.S. Application Data

[63] Continuation of Ser. No. 131,714, Oct. 5, 1993, Pat. No. 5,484,557.

[51] Int. Cl.⁶ .................................................. B29C 47/90
[52] U.S. Cl. ........................... 425/71; 264/37; 264/560; 264/568; 264/177.19; 264/209.4; 425/326.1; 425/388
[58] Field of Search ........................ 264/37, 38, 177.17, 264/177.19, 209.3, 209.4, 557, 558, 559, 560, 561, 562, 568, DIG. 78; 425/71, 326.1, 388, DIG. 60

[56] References Cited

U.S. PATENT DOCUMENTS

| | | | |
|---|---|---|---|
| 3,169,272 | 2/1965 | Maxson . | |
| 3,270,806 | 9/1966 | Borrini | 165/156 |
| 3,513,503 | 5/1970 | Paradis et al. . | |
| 3,538,210 | 11/1970 | Gatto | 264/90 |
| 3,576,929 | 4/1971 | Turner et al. | 264/37 |
| 3,778,205 | 12/1973 | Turner et al. | 425/71 |
| 3,825,641 | 7/1974 | Barnett | 264/89 |
| 3,851,028 | 11/1974 | Beyer | 264/89 |
| 3,931,379 | 1/1976 | Cruson et al. | 264/45.5 |
| 4,100,243 | 7/1978 | Wissinger et al. | 264/171 |
| 4,120,926 | 10/1978 | Titz | 264/89 |
| 4,251,195 | 2/1981 | Suzuki et al. | 425/6 |
| 4,340,340 | 7/1982 | Brown et al. | 425/71 |
| 4,530,650 | 7/1985 | Milani | 425/71 |
| 4,575,326 | 3/1986 | French | 425/71 |
| 4,621,678 | 11/1986 | Hahn et al. | 165/27 |
| 4,740,146 | 4/1988 | Angelbeck | 425/71 |
| 4,750,873 | 6/1988 | Loe et al. | 425/71 |
| 4,927,574 | 5/1990 | Herrington | 264/40.6 |
| 5,340,295 | 8/1994 | Preiato et al. | 425/71 |

FOREIGN PATENT DOCUMENTS

| | | | |
|---|---|---|---|
| 2322724 | 5/1977 | France | 264/560 |
| 3220837A1 | 12/1983 | Germany . | |
| 3301556 | 7/1984 | Germany | 425/71 |
| 3241005 | 8/1984 | Germany | 264/209.4 |
| 2087786A | 6/1982 | United Kingdom . | |

Primary Examiner—C. Scott Bushey
Attorney, Agent, or Firm—Seed and Berry LLP

[57] ABSTRACT

An isobaric vaporization cooling for extruded thermoplastic profiles is carried out at 25 inches Hg in a tank by spraying water onto the extrusions. The water vapor and any air entering the tank are withdrawn to maintain the pressure constant during the cooling and the condensate from the withdrawn vapor is recycled to the spraying nozzles.

32 Claims, 1 Drawing Sheet

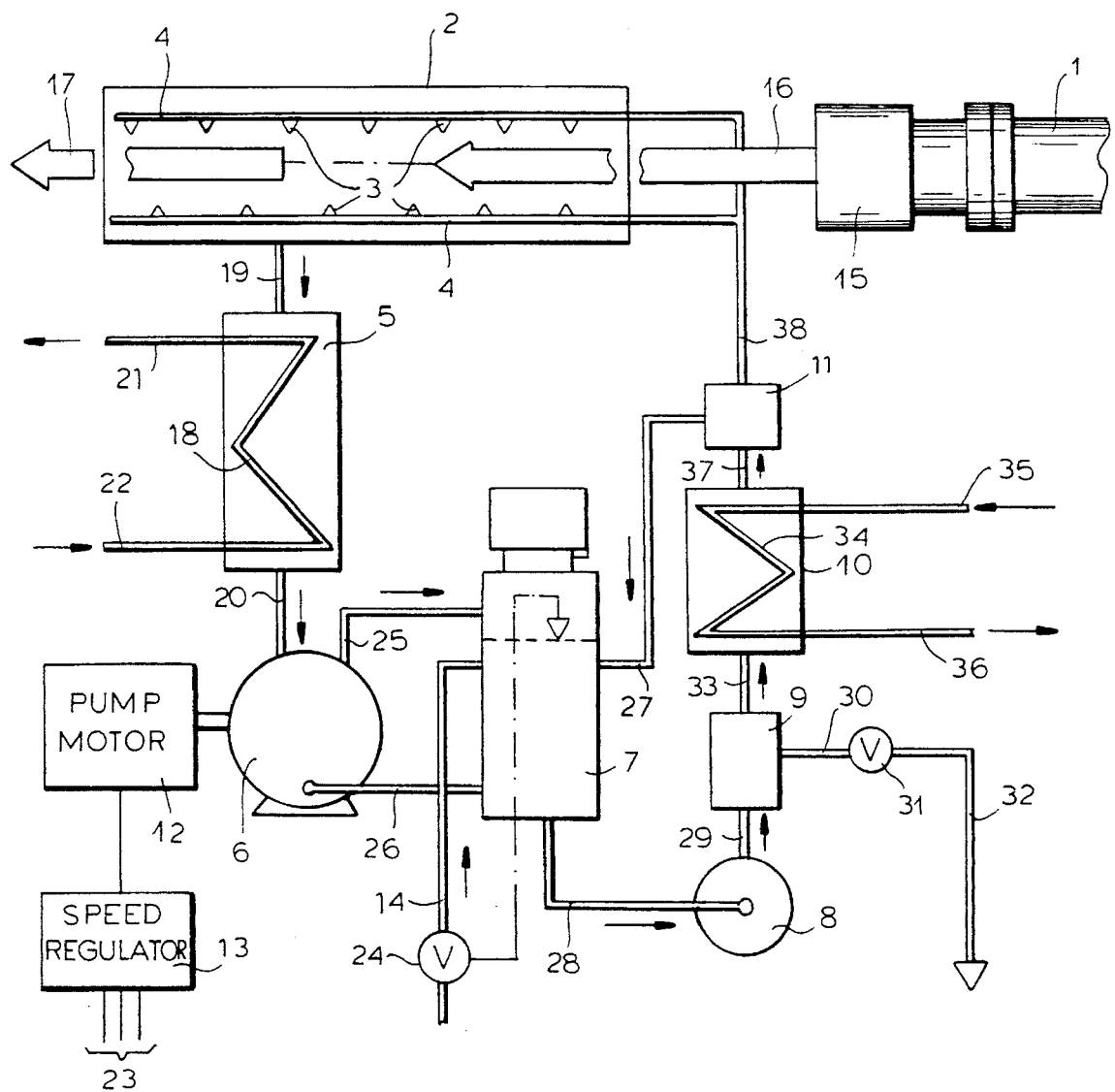

5,578,328

APPARATUS FOR THE COOLING OF EXTRUDED PLASTIC PROFILES OR SECTIONS

CROSS-REFERENCE TO RELATED APPLICATION

This application is a continuation of U.S. patent application Ser. No. 08/131,714, filed Oct. 5, 1993, now U.S. Pat. No. 5,484,557.

FIELD OF THE INVENTION

My present invention relates to a method of and to an apparatus for the cooling of hot extruded thermoplastic profiles following their emergence from the extrusion die of an extruder. More particularly this invention relates to an isobaric vaporization cooling process for such profiles.

BACKGROUND OF THE INVENTION

Extrusion process are known for the production of a variety of structural shapes, sections and profiles of thermoplastic materials, such as polyvinylchloride. Among the structural shapes, sections or profiles produced by extrusion are window-forming profiles, window frame members, door frame members, siding and the like.

An extruded material emerges from an extrusion die after having been plastified, masticated and mixed at elevated temperatures in a worm-type extruder with at last one screw and generally at least two screws, at an elevated temperature so that cooling of the extrusion is required.

While air cooling is possible, the amount of heat which can be abstracted from the extrusions by air cooling processes is limited so that significant cooling stretches are required.

Conventional water cooling techniques, whereby water is simply sprayed on the extruded profile have been found to be uneconomical and of low energy efficiency.

OBJECTS OF THE INVENTION

It is, therefore, the principal object of the present invention to provide an improved process for the cooling of a hot extruded profile, preferably from a temperature close to that at which the extruded profile emerges from the extruder or die to ambient temperature, whereby drawbacks of earlier cooling processes are avoided.

Another object of this invention is to provide an improved method of cooling a hot extruded profile which minimizes the utilization of cooling water and thus has high energy and water-utilization efficiency.

It is also an object of the invention to provide a highly economical process for cooling extruded profiles which can be carried out at low capital cost and which is easy and inexpensive to control.

Still another object of my invention is to provide an improved apparatus for the cooling of such profiles, preferably in association with an extruder, which can achieve the advantages of improved method and is also free from drawbacks of earlier cooling systems.

SUMMARY OF THE INVENTION

I have now discovered that the drawbacks of earlier systems for the cooling of hot extruded profiles, especially with respect to energy efficiency and water consumption, can be overcome by an isobaric vaporization cooling process in which the hot extruded profile is cooled by spraying water onto it and vaporizing the water on contact with the hot profile into a subatmospheric pressure which is maintained constant in a vacuum tank in which the extrusion, profile or section is cooled.

More particularly, the method of cooling a hot extruded thermoplastic section according to the invention can comprise the steps of:

(a) enclosing a hot extruded thermoplastic section to be cooled in a vacuum tank;

(b) generating a subatmospheric pressure in the tank;

(c) spraying liquid water into the tank and onto the hot extruded thermoplastic section, thereby evaporating the liquid water to produce water vapor and cool the extruded section at the pressure;

(d) withdrawing water vapor produced in the tank and condensing the withdrawn water vapor to maintain the pressure in the tank during the cooling of the extruded section; and (e) recycling condensed water from step (d) to step (c) as at least part of the liquid water sprayed in step (c) onto the hot extruded thermoplastic section.

Indeed, I have found that by far the best results are obtained when the absolute pressure in the tank is 25 inches of mercury column or 0.13675 atmospheres (absolute) with a resulting vaporization temperature of 50° C.

According to a feature of the invention, the water vapor withdrawn from the tank is condensed by indirect heat exchange with a liquid coolant which can also be water. The condensing of the water vapor in a water vapor or steam condenser connected to the vacuum tank can maintain, at least in part, the subatmospheric pressure in the vacuum tank. Of course, when the tank is open at its inlet and outlet, e.g. for continuous passage of the profile or section through the tank during the cooling process and air must be evacuated to balance the air drawn in through the inlet and/or outlet, a suction pump can additionally be connected to the condenser so that a mixture of air and water vapor is withdrawn from the tank and a mixture of air and liquid water (condensate) is delivered to an air/liquid separator from which the liquid water can be recycled to the sprayers in the tank.

According to a feature of the invention, subatmospheric pressure in the tank is maintained by controlling the temperature of the liquid coolant or the flow rate thereof or both.

The subatmospheric pressure can be initially established in the vacuum tank by at least temporarily connecting a vacuum pump to the latter through the condenser or by temporarily operating that vacuum pump and the subatmospheric pressure can be sustained by the use of that pump. For that purpose, the pump is advantageously a variable-speed pump.

Thus an important step of the method or process can be the step of controlling the speed of the vacuum pump to regulate the pressure at least initially.

According to a further feature of the invention, the liquid water which is recycled, according to the invention, can be filtered, preferably through a self-cleaning or automatically cleaned filter.

The vacuum pump can be continuously operated during cooling of the extruded section at least at a rate sufficient to balance air incursion into the tank with the air being separated from liquid water downstream of the vacuum pump and prior to recycling the water. The air/water separator can also be used as a reservoir for storing the liquid water received from the vacuum pump and prior to recycling. In that case the method can comprise the step of maintaining a substantially constant level of liquid water in the air/liquid separator.

According to another aspect of the invention, an apparatus for producing an extrusion can comprise, in combination, an extruder for producing the hot extruded thermoplastic section and means for cooling that section. The means for cooling can comprise, in turn, a vacuum tank for producing an extrusion, comprising, in combination, an extruder for producing a hot extruded thermoplastic section, and means for cooling the hot extruded thermoplastic section, the means for cooling comprising:

a vacuum tank downstream of the extruder for receiving and enclosing the hot extruded thermoplastic section to be cooled and produced in the extruder;

means for generating a subatmospheric pressure in the tank;

spray means in the tank for spraying liquid water into the tank and onto the hot extruded thermoplastic section, thereby evaporating the liquid water to produce water vapor and cool the extruded section at the pressure;

means for withdrawing water vapor produced in the tank and condensing the withdrawn water vapor to maintain at least in part the pressure in the tank during the cooling of the extruded section; and means for recycling condensed water to the spray means as at least part of the liquid water sprayed onto the hot extruded thermoplastic section.

In this context, the means for withdrawing can include a water-cooled condenser connected to the vacuum tank.

The means for generating can include the vacuum pump connected to the water-cooled condenser for drawing a vacuum in the tank through the condenser. Speed-control means is provided for controlling the motor of the vacuum pump and thus the rate at which a vacuum is drawn in the tank and the condenser. The means for recycling can include:

an air/liquid separator connected to the vacuum pump for separating water condensed in the condenser from air drawn from the tank with water vapor by the vacuum pump;

means for maintaining a constant water level in the separator;

a water pump for feeding water from the separator to the spray means; and a pressure regulator between the water pump and the spray means for controlling a pressure with which water is fed to the spray means.

BRIEF DESCRIPTION OF THE DRAWING

The above and other objects, features and advantages of the invention will become more readily apparent from the following description, reference being made to the sole FIGURE which is a flow diagram illustrating an apparatus according to the present invention.

SPECIFIC DESCRIPTION AND EXAMPLE

In the drawing I have shown an extruder 1 which can be of the American Maplan TS-88 type and which can be provided with an extrusion die 15 for producing, for example, window frame or door frame profiles 16.

The extruded profile or extrusion 16 can be fed to a vacuum tank 2 and, for that purpose, between the extrusion die 15 and the vacuum tank 2, a caterpillar puller of the type American Maplan CP-P-1.2 and a cut-off saw of the type American Maplan SP-16/08/30, can be provided.

The isobaric vaporization cooling vacuum tank 2 is designed to be able to sustain a subatmospheric pressure of 25 inches of mercury and thus 0.13675 atmosphere (absolute). The cooled profile is discharged at 17.

Within the vacuum tank 2, pipes 4 conduct the cooling liquid to spray nozzles or heads 3 which spray the water onto the extrusion 16, the water being vaporized at a temperature of 50° C. at the subatmospheric pressure within the tank.

Water vapor and any air which may enter the vacuum tank 2 through the inlet and outlet sides thereof is drawn through a pipe 19 into a steam condenser 5 provided with a coil 18 for the indirect heat exchange between the water vapor or steam and a cooling water discharged via pipe 21 and supplied via pipe 22. The liquid water and air mixture from the steam condenser 5 is fed by a pipe 20 to a vacuum pump 6.

The liquid water and air mixture can be forced by the vacuum pump 6 via a line 25 into an air/liquid separator 7. The water can be withdrawn from the separator by the vacuum pump 6 via a line 26 and the water level may be maintained constant in the separator 7 by a level control represented here as a valve 24 connected to a water supply line 14 which provides the make-up water as well.

As noted previously, the air/liquid separator 7 serves as a reservoir for the recycled water, and thus liquid water is withdrawn from the separator 7 via a line 28 and fed by a water pump 8 through a line 29 to a filter 9. The filter 9 may be of the self-cleaning type and contaminants can be carried off via a line 30 as controlled by valve 31 to be discharged through line 32.

The recycled water is fed via a line 33 through a heat exchanger 10 provided with a cooling coil 34 having an inlet 35 and an outlet 36 connected respectively to a source of cooling water and to a return therefor.

The recycled water is then fed via a line 37 through a pressure regulator 11 to a line 38 feeding the spray heads 3.

Bypassed water is returned by the pressure regulator 11 through a line 27 to the air/liquid separator 7.

The pump 6 has a pump motor 12 whose speed is controlled by a speed regulator 13 connected to a power supply line 23.

Utilizing this system and initially drawing a vacuum of 25 inches of mercury and maintaining that pressure in the vacuum tank 2 by condensation of water in the steam condenser 5 and by controlled speed operation of the vacuum pump 6, I am able per 1000 pounds per hour of extruded double-hung frame profiles to effect cooling, other things being equal, with 112.5 kilowatts of total connected power compared with 310 kilowatts for conventional spray cooling and a water consumption of 5,380 gallons per hour as compared with 15,600 gallons per hour.

At the same time the cost of equipment can be reduced by almost 70% and the man-power utilization by almost 70%. There is, additionally, a saving of reduced maintenance of the equipment, improvement of the quality of the extruded product because of greater stability of the process, etc.

The extrusion rate of the extruder is 1000 pounds per hour at 200° C. and the temperature of the cooling water at pipe 22 is 7° C. and at pipe 21 is 10° C. Correspondingly the cooling water at inlet 35 is 7° C. and at outlet 36 is 10° C.

The extruded material is rigid polyvinylchloride. The specific heat of the material is 0.9 to 2 J/g·K. The specific heat conductivity is 0.15 to 0.18 W/·Km.

The profile weight was 1276 g/m, the cross section was 876.2 mm² and the wall thickness was 1.5 mm. The cooled temperature of the profile was 30° C.

I claim:

1. An apparatus for producing an extrusion, comprising, in combination, an extruder for producing a hot extruded thermoplastic section, and means for cooling the hot extruded thermoplastic section, said means for cooling comprising:

a vacuum tank downstream of said extruder for receiving and enclosing the hot extruded thermoplastic section to be cooled and produced in said extruder;

means for generating a selected subatmospheric isobaric pressure in said tank at which liquid water sprayed onto the extruded section will vaporize;

spray means in said tank for spraying a sufficient amount of liquid water into said tank and onto the extruded section to vaporize the liquid water to produce water vapor within said tank and cool the extruded section to a rigid state while within said tank and at said selected pressure;

means for withdrawing from said tank said water vapor produced in said tank and condensing said withdrawn water vapor in sufficient amounts to maintain said selected pressure in said tank during the cooling of the extruded section, thereby producing condensed water; and means for supplying said condensed water to said spray means as at least part of said liquid water sprayed onto the extruded section.

2. The apparatus defined in claim 1 wherein said means for withdrawing includes a water-cooled condenser connected to said tank to withdraw said water vapor from said tank and condense said withdrawn water vapor.

3. The apparatus defined in claim 2 wherein said means for generating includes a vacuum pump connected to said water-cooled condenser to draw a vacuum in said tank through said water-cooled condenser.

4. The apparatus defined in claim 3, further comprising speed-control means connected to said vacuum pump for controlling a rate at which a vacuum is drawn in said tank and said condenser.

5. The apparatus defined in claim 3 wherein said means for supplying includes:

an air/liquid separator connected to said vacuum pump for separating water condensed in said water-cooled condenser from air drawn from said tank with said water vapor by said vacuum pump;

means for maintaining said separated water at a constant water level in said separator;

a water pump for feeding said separated water from said separator to said spray means; and a pressure regulator between said water pump and said spray means for controlling a pressure with which said separated water is fed to said spray means.

6. The apparatus defined in claim 5, further comprising a self-cleaning filter disposed between said water pump and said pressure regulator to filter said separated water.

7. The apparatus defined in claim 6, further comprising a water-cooled heat exchanger disposed between said separator and said spray means for cooling said separated water before being supplied to said spray means.

8. The apparatus defined in claim 1 wherein said selected pressure is an absolute pressure of substantially 25 inches Hg column and liquid water is vaporized in said tank at a vaporization temperature of substantially 50° C.

9. An apparatus for cooling a hot extruded thermoplastic section, comprising:

a vacuum tank sized to enclose the hot extruded thermoplastic section to be cooled;

a vacuum source connected to said tank and operating to at least initially generate a selected subatmospheric isobaric pressure in said tank at which liquid water sprayed onto the extruded section will vaporize;

sprayers positioned at said tank and operating to spray a sufficient amount of liquid water into said tank and onto the extruded section to vaporize the liquid water to produce water vapor within said tank and cool the extruded section to a rigid state while within said tank at said selected pressure;

a condenser connected to said tank and withdrawing from said tank said water vapor produced in said tank and condensing said withdrawn water vapor in sufficient amounts to maintain said selected pressure in said tank during the cooling of the extruded section, thereby producing condensed water; and a water return supplying said condensed water condensed by said condenser to said sprayers to be used as at least part of said liquid water sprayed by said sprayers onto the extruded section.

10. The apparatus defined in claim 9 wherein said selected pressure is an absolute pressure of substantially 25 inches Hg column and liquid water is vaporized in said tank at a vaporization temperature of substantially 50° C.

11. The apparatus defined in claim 9 wherein said condenser condenses said withdrawn water vapor by indirect heat exchange with a liquid coolant.

12. The apparatus defined in claim 11 further including a cooling source connected to said condenser to selectively adjust a temperature of said liquid coolant to maintain said selected pressure in said tank.

13. The apparatus defined in claim 11 further including a flow rate controller to selectively adjust a flow rate of said liquid coolant to maintain said selected pressure in said tank.

14. The apparatus defined in claim 9 wherein said vacuum source includes a vacuum pump connected to said tank to at least initially generate said selected pressure in said tank.

15. The apparatus defined in claim 14, further including a speed regulator and wherein said vacuum pump operates at variable speeds, said speed regulator selectively adjusting a speed of said vacuum pump to maintain said selected pressure in said tank.

16. The apparatus defined in claim 14 wherein said vacuum pump is connected to said tank through said condenser and draws a vacuum in said tank through said condenser.

17. The apparatus defined in claim 9, further including a filter connected to said condenser to filter said condensed water prior to said water return supplying said condensed water to said sprayers.

18. The apparatus defined in claim 14 wherein said vacuum pump is continuously operated during cooling of the extruded section to withdraw sufficient air to balance air incursion into said tank.

19. The apparatus defined in claim 18, further including an air/liquid separator connected to said vacuum pump and storing said condensed water received from said vacuum pump prior to said water return supplying said condensed water to said sprayers.

20. The apparatus defined in claim 19, further including a level control connected to said air/liquid separator and maintaining a substantially constant level of liquid water in said air/liquid separator.

21. The apparatus defined in claim 18, further including an air/liquid separator receiving said condensed water from said vacuum pump and separating said withdrawn air from said condensed water prior to said condensed water being supplied to said sprayers by said water return.

22. An apparatus for cooling a hot extruded section in a continuous extrusion process, comprising:

a vacuum tank enclosing the hot extruded section to be cooled;

a water vapor control system generating a selected sub-atmospheric pressure in said tank at which liquid water sprayed onto the extruded section will vaporize, said control system withdrawing from said tank said water vapor produced in said tank in sufficient amounts to maintain said selected pressure in said tank during the cooling of the extruded section; and a sprayer positioned to spray liquid water into said tank and onto the extruded section to vaporize the liquid water to produce water vapor within said tank and cool the extruded section to a rigid state while within said tank at said selected pressure.

23. The apparatus defined in claim 22 for use with an extruded section that is a thermoplastic wherein said control system generates said selected pressure to be an absolute pressure of substantially 25 inches Hg column such that liquid water is vaporized in said tank at a vaporization temperature of substantially 50° C.

24. The apparatus defined in claim 22 wherein said control system includes a condenser condensing said withdrawn water vapor at a rate sufficient to maintain said selected pressure in said tank.

25. The apparatus defined in claim 24 wherein said control system condenses said withdrawn water vapor by indirect heat exchange with a liquid coolant.

26. The apparatus defined in claim 25 wherein said control system includes a cooling source selectively adjusting a temperature of said liquid coolant to maintain said selected pressure in said tank.

27. The apparatus defined in claim 25 wherein said control system includes a flow rate controller selectively adjusting a flow rate of said liquid coolant to maintain said selected pressure in said tank.

28. The apparatus defined in claim 22 wherein said control system includes a vacuum pump to at least initially generate said selected pressure in said tank.

29. The apparatus defined in claim 28 wherein said vacuum pump is continuously operated and said control system includes a pump speed regulator selectively adjusting a speed of said vacuum pump to maintain said selected pressure in said tank.

30. The apparatus defined in claim 28 wherein said control system includes a liquid-cooled condenser which condenses said withdrawn water vapor and said vacuum pump draws a vacuum in said tank through said condenser.

31. The apparatus defined in claim 28 wherein said vacuum pump is continuously operated during cooling of the extruded section to withdraw sufficient air to balance air incursion into said tank.

32. The apparatus defined in claim 22 wherein said control system includes a source of vacuum to at least in part initially generate said selected pressure in said tank and a condenser which subsequently maintains said selected pressure in said tank during cooling of the extruded section at least in part by condensing said withdrawn water vapor to produce a vacuum and applying said produced vacuum to said tank.

* * * * *